US008850265B2

(12) United States Patent
He et al.

(10) Patent No.: US 8,850,265 B2
(45) Date of Patent: Sep. 30, 2014

(54) PROCESSING TEST CASES FOR APPLICATIONS TO BE TESTED

(75) Inventors: Le He, Beijing (CN); Zhong J. Li, Beijing (CN); Yong G. Pan, Beijing (CN); Chunhua Tian, Beijing (CN); Rui Xiong Tian, Beijing (CN); Qing Bo Wang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/435,807

(22) Filed: Mar. 30, 2012

(65) Prior Publication Data

US 2012/0254660 A1    Oct. 4, 2012

(30) Foreign Application Priority Data

Mar. 30, 2011    (CN) .......................... 2011 1 0085746

(51) Int. Cl.
  *G06F 11/00*    (2006.01)
  *G06F 11/36*    (2006.01)
(52) U.S. Cl.
  CPC .................................. *G06F 11/3688* (2013.01)
  USPC .......................................................... 714/28
(58) Field of Classification Search
  CPC ............ G06F 11/3688; G06F 11/3664; G06F 11/3672; G06F 11/3616; G06F 11/3428; G06F 11/3684
  USPC ...................................................... 714/1–57
  See application file for complete search history.

(56) References Cited

U.S. PATENT DOCUMENTS

| 5,805,795 | A | * | 9/1998 | Whitten ....................... 714/38.1 |
| 7,039,912 | B1 | * | 5/2006 | Moulden et al. .............. 718/100 |
| 8,347,267 | B2 | * | 1/2013 | Givoni et al. ................. 717/124 |
| 2003/0167422 | A1 | * | 9/2003 | Morrison et al. ............... 714/38 |
| 2006/0174162 | A1 | * | 8/2006 | Varadarajan et al. ........... 714/38 |
| 2010/0131928 | A1 | * | 5/2010 | Parthasarathy et al. ....... 717/126 |
| 2010/0180260 | A1 | * | 7/2010 | Chikkadevaiah et al. ..... 717/125 |
| 2010/0198960 | A1 |   | 8/2010 | Kirschnick et al. |
| 2011/0035629 | A1 | * | 2/2011 | Noller et al. ............... 714/38.14 |
| 2011/0055634 | A1 |   | 3/2011 | Huang |
| 2013/0275946 | A1 | * | 10/2013 | Pustovit et al. ............... 717/124 |

FOREIGN PATENT DOCUMENTS

| CN | 101655817 | 2/2010 |
| CN | 101814055 | 8/2010 |
| JP | 2009245383 | 10/2009 |

* cited by examiner

*Primary Examiner* — Nadeem Iqbal
(74) *Attorney, Agent, or Firm* — Tutunjian & Bitetto, P.C.; Gail Zarick

(57) ABSTRACT

The present invention discloses a method and system for processing test cases for applications to be tested. The method includes evaluating two applications to be tested; obtaining test cases for the two applications to be tested and determining resources and execution times needed by the test cases for the two applications to be tested. According to the compatibility relationship between the two applications to be tested, and the resources and execution times needed by the test cases for the two applications to be tested, the test cases for the two applications to be tested are clustered to a virtual machine instance to test the test cases for the two applications to be tested on the virtual machine instance.

21 Claims, 7 Drawing Sheets

PROCESSING TEST CASES FOR APPLICATIONS TO BE TESTED

TECHNICAL FIELD

Embodiments of the present invention relate to information technology, and more specifically, to a method and system for processing test cases for applications to be tested.

BACKGROUND

Information technology (IT) architecture of an enterprise is very complex, and it might contain hundreds of applications that are coupled to one another in a very complex way. In this circumstance, performing test on applications becomes a challenging task. Testing is one of the largest money and time consumers in a software development budget. 30% to 50% of servers are dedicated for testing, and most test servers run at utilization of less than 10%. Therefore, it will waste large amounts of resources.

There are already some companies providing Cloud test environments to users. When users have to perform test, they may use corresponding test environments of these companies so as to save resources.

Nowadays, a common way of applying Cloud test environments is to allocate respective applications to different virtual machine (VM) instances that have corresponding configurations, according to separate original hardware and software configurations needed for testing applications. In such a way, capacity planning is avoided; however, a tremendous waste may be caused as original hardware and software configurations may not be well planned and the capacity exceeds the demand.

SUMMARY

Therefore, there is a need for a solution which overcomes the foregoing problems, for processing test cases for applications to be tested.

According to one aspect of the present invention, there is a method for processing test cases for applications to be tested, the method comprising: evaluating at least two applications to be tested in order to determine a compatibility relationship between the at least two applications to be tested; obtaining test cases for the at least two applications to be tested and determining resources and execution times needed by the test cases for the at least two applications to be tested; according to the compatibility relationship between the at least two applications to be tested, and the resources and execution times needed by the test cases for the at least two applications to be tested, clustering the test cases for the at least two applications to be tested to at least one virtual machine instance to test the test cases for the at least two applications to be tested on the at least one virtual machine instance.

According to a second aspect of the present invention, there is a system for processing test cases for applications to be tested, the system comprising: an evaluator configured to evaluate at least two applications to be tested to determine a compatibility relationship between the at least two applications to be tested; a determinator configured to obtain test cases for the at least two applications to be tested and determine resources and execution times needed by the test cases for the at least two applications to be tested; a clustering device configured to, according to the compatibility relationship between the at least two applications to be tested, and the resources and execution times needed by the test cases for the at least two applications to be tested, cluster the test cases for the at least two applications to be tested to at least one virtual machine instance to test the test cases for the at least two applications to be tested on the at least one virtual machine instance.

According to various embodiments of the present invention, test cases for at least two applications to be tested that are allocated to different virtual machine instances according to the prior art can be allocated to the same virtual machine instance whose performance meets requirements. Therefore, the utilization of virtual machine instances can be improved.

BRIEF DESCRIPTION OF THE DRAWINGS

As the present invention is comprehended more thoroughly, other objects and effects of the present invention will become more apparent and easier to understand from the following description with reference to the accompanying drawings, wherein.

Like numerals represent the same, similar or corresponding features or functions throughout the figures.

DETAILED DESCRIPTION OF THE PREFERRED EMBODIMENT

Embodiments of the present invention will be described in detail below with reference to the figures.

The flowcharts and block diagrams in the figures illustrate architectures, functions and operations achievable by the system, methods and computer program products in accordance with various embodiments of the present invention. In this regard, each block in the flowcharts or block diagrams may represent a module, a program segment, or a part of code, which contains one or more executable instructions for implementing specified logic functions. It should be noted that in some alternative implementations, functions indicated in the blocks may occur in an order differing from the order as indicated in the figures. For example, two blocks shown consecutively may in fact be performed substantially in parallel or in an inversed order sometimes, which depends on the functions involved. It should also be noted that each block and a combination of blocks in the block diagrams or flowchart may be implemented by a dedicated, hardware-based system for performing specified functions or operations, or by a combination of dedicated hardware and computer instructions.

In one embodiment of the present invention, according to a compatibility relationship between at least two applications to be tested and resources and execution times needed by test cases for the at least two applications to be tested, the test cases for the at least two applications to be tested are clustered to at least one virtual machine (VM) instance so as to be tested on the at least one VM instance.

According to one embodiment of the present invention, possible waste of VM instance utilization caused by the act of allocating to different VM instances test cases for a plurality of applications to be tested that may reside on one VM instance is eliminated.

Figure 1:
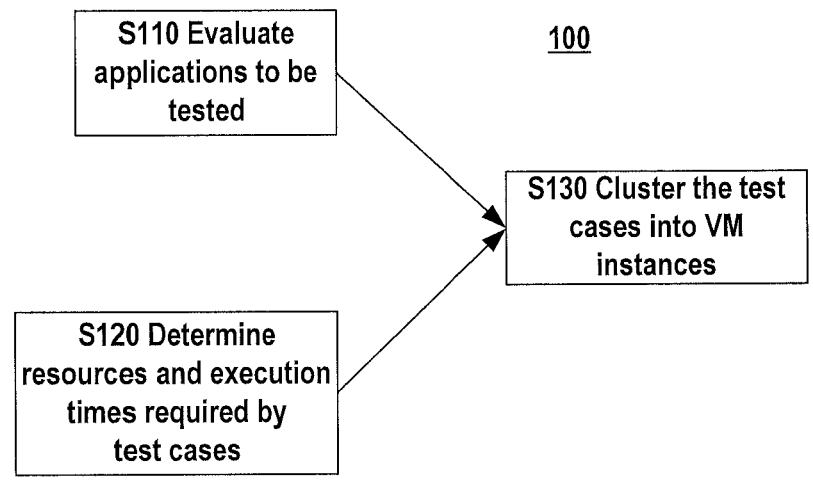
FIG. 1 illustrates a flowchart of a method for processing test cases for applications to be tested according to an embodiment of the present invention.

FIG. 1 illustrates a flowchart of a method for processing test cases for applications to be tested according to one embodiment of the present invention. As illustrated in FIG. 1, the method 100 comprises: step S110 of evaluating at least two applications to be tested to determine a compatibility relationship between the at least two applications to be tested; step S120 of obtaining test cases for the at least two applications to be tested and determining resources and execution times needed by the test cases for the at least two applications to be tested; and step S130 of according to the compatibility relationship between the at least two applications to be tested and the resources and execution times needed by the test cases for the at least two applications to be tested, clustering the test cases for the at least two applications to be tested to at least one VM instance so as to test the test cases for the at least two applications to be tested on the at least one VM instance.

In one embodiment, the compatibility relationship between the at least two applications to be tested comprises one of a hardware compatibility relationship and a software compatibility relationship.

The hardware compatibility relationship refers to whether hardware needed by one application to be tested is compatible with hardware needed by another to-be-tested application.

According to one embodiment of the present invention, a hardware compatibility relationship between two applications to be tested is determined based on whether types of hardware needed by the two applications to be tested are identical.

When the types of hardware needed by the two applications to be tested are identical, it is determined that the hardware compatibility relationship between the two applications to be tested is compatible.

When the types of hardware needed by the two applications to be tested are different, it is determined that the hardware compatibility relationship between the two applications to be tested is incompatible.

For example, if one application to be tested needs a CPU, Memory, a Hard Disk, and a Switch, while the other one needs a CPU, Memory, a Hard Disk, and a Network Card, since types of hardware needed by the two applications to be tested are different, it is determined that a hardware compatibility relationship between the two applications to be tested is incompatible.

According to one embodiment of the present invention, a hardware compatibility relationship between two applications to be tested may be determined further based on whether the existence of different types of hardware will affect the execution of the two applications to be tested or not.

In the event that types of hardware needed by one application to be tested differ from types of hardware needed by the other one, if the existence of different types of hardware will not affect the execution of the two applications to be tested, it is determined that a hardware compatibility relationship between the two applications to be tested is compatible; if the existence of different types of hardware will affect the execution of the two applications to be tested, it is determined that a hardware compatibility relationship between the two applications to be tested is incompatible.

For example, if one application to be tested needs a CPU, Memory, a Hard Disk, and a Switch, while the other one needs a CPU, Memory, a Hard Disk, and a Network Card, and if the existence of the Network Card and the Switch will not affect the execution of these two applications to be tested, it is determined that a hardware compatibility relationship between the two applications to be tested is compatible; if the existence of the Network Card and the Switch will affect the execution of these two applications to be tested, it is determined that a hardware compatibility relationship between the two applications to be tested is incompatible.

Of course, those skilled in the art would appreciate that there may exist other rules for determining a hardware compatibility relationship between two applications to be tested.

For example, in one embodiment of the present invention, a hardware compatibility relationship between two applications to be tested may be determined further based on whether specific hardware needed by the two applications to be tested is identical.

In the event that types of hardware needed by one application to be tested are the same as types of hardware needed by the other one, if specific hardware needed by one application to be tested is the same as specific hardware needed by the other one, for example, both of the two applications to be tested need DDR2 (double data rate) Memory, it is determined that a hardware compatibility relationship between these two applications to be tested is compatible; if specific hardware needed by one application to be tested is different from specific hardware needed by the other one, for example, one application to be tested needs DDR2 Memory while the other one needs DDR3 Memory, it is determined that a hardware compatibility relationship between these two applications to be tested is incompatible.

The software compatibility relationship refers to whether software needed by one application to be tested is compatible with software needed by another to-be-tested application.

According to one embodiment of the present invention, a software compatibility relationship between two applications to be tested is determined based on whether types of software needed by the two applications to be tested are identical.

When the types of software needed by the two applications to be tested are different, it is determined that the software compatibility relationship between the two applications to be tested is incompatible.

When the types of software needed by the two applications to be tested are identical, it is determined that the software compatibility relationship between the two applications to be tested is compatible.

For example, if one application to be tested needs the following software: Operating System, Web Server, Database, and Compiling Tool; while the other to-be-tested application needs the following software: Operating System, Web Server, Database, and Compiling Tool, it is determined that a software compatibility relationship between the two applications to be tested is compatible, since types of software needed by the two applications to be tested are identical.

In one embodiment of the present invention, a software compatibility relationship between two applications to be tested is determined further based on whether specific software needed by the two applications to be tested is identical.

In the event that types of software needed by one application to be tested are the same as types of software needed by the other one, if specific software needed by one application to be tested is the same as specific software needed by the other one, for example, both of the two applications to be tested need Windows® Operating System, Tomcat® Web Server, Oracle® Database, and .NET® Compiling Tool, it is determined that a software compatibility relationship between these two applications to be tested is compatible. If specific software needed by one application to be tested is different from specific software needed by the other one, for example, one application to be tested needs Windows® Operating System, Tomcat® Web Server, Oracle® Database, and .NET® Compiling Tool, while the other one needs Linux Operating System, Tomcat® Web Server, Oracle® Database, and .NET® Compiling Tool, it is determined that a software compatibility relationship between these two applications to be tested is incompatible.

In one embodiment of the present invention, a software compatibility relationship between two applications to be tested is determined further based on whether versions of specific software needed by the two applications to be tested are compatible.

In the even that specific software needed by one application to be tested is the same as specific software needed by the other one, if the version of the specific software needed by one application to be tested is compatible with the version of the specific software needed by the other one, i.e., a higher version of the specific software includes functions of a lower version of the specific software, for example, one application to be tested needs Windows® 7 Operating System, Tomcat® 7.0 Web Server, Oracle® 10 g Database, and .NET® 4 Compiling Tool, while the other needs Windows® XP Operating System, Tomcat® 7.0 Web Server, Oracle® 10 g Database, and .NET® 4 Compiling Tool, and Windows® 7 Operating System is compatible with Windows® XP Operating System, i.e., Windows® 7 Operating System includes functions of Windows® XP Operating System, then it is determined that a software compatibility relationship between these two applications to be tested is compatible. If the version of specific software needed by one application to be tested is incompatible with the version of specific software needed by the other one, i.e., a higher version of specific software does not include some functions of a lower version of the specific software, then it is determined that a software compatibility relationship between these two applications to be tested is incompatible.

According to one embodiment of the present invention, a software compatibility relationship between two applications to be tested is determined further based on whether configurations of the two applications to be tested conflict.

Examples of whether configurations of two applications to be tested conflict comprise whether port number configurations of the two to-be-tested applications conflict.

For example, when both of the two applications to be tested use a default 8443 port number, a configuration conflict occurs.

If configurations of two applications to be tested conflict, it is determined that a software compatibility relationship between the two applications to be tested is incompatible.

If configurations of two applications to be tested do not conflict, it is determined that a software compatibility relationship between the two applications to be tested is compatible.

In one embodiment of the present invention, a software compatibility relationship between two applications to be tested is determined further based on whether a configuration of at least one of the two applications to be tested can be modified.

In the event that configurations of two applications to be tested conflict, if the configuration of at least one of the two applications to be tested can be modified, then it is determined that a software compatibility relationship between the two applications to be tested is compatible. If the configuration of neither of the two applications to be tested can be modified, it is determined that a software compatibility relationship between the two applications to be tested is incompatible.

Of course, those skilled in the art would appreciate that there may exist other rules for determining a software compatibility relationship between two applications to be tested.

For example, in one embodiment of the present invention, a software compatibility relationship between two applications to be tested is determined further based on whether the existence of different types of software will affect the execution of the two applications to be tested or not.

In the event that types of software needed by one application to be tested differ from types of software needed by the other one, if the existence of different types of software will not affect the execution of the two applications to be tested, it is determined that a software compatibility relationship between the two applications to be tested is compatible. If the existence of different types of software will affect the execution of the two applications to be tested, it is determined that a software compatibility relationship between the two applications to be tested is incompatible.

In one embodiment of the present invention, a software compatibility relationship between two applications to be tested is determined further based on whether the existence of different specific software will affect the execution of the two applications to be tested or not.

In the event that specific software needed by one application to be tested differ from specific software needed by the other one, if the existence of different specific software will not affect the execution of the two applications to be tested, it is determined that a software compatibility relationship between the two applications to be tested is compatible. If the existence of different specific software will affect the execution of the two applications to be tested, it is determined that a software compatibility relationship between the two applications to be tested is incompatible.

Generally, an application has a document describing its hardware and software requirements, and the hardware and software requirements may be obtained by reading the document with a program.

In addition, whether configurations of each application in accordance with a certain application configuration framework conflict may be determined by analyzing configuration files of each application.

Compatibility relationships among a plurality of applications to be tested may be stored in an application compatibility relationship matrix.

There may be two application compatibility relationship matrices, one of which is for hardware and the other of which is for software.

A hardware compatibility relationship matrix ($M^{HW}$) records compatibility relationships of each hardware requirement item between each pair of applications to be tested. Table 1 shows an example of $M^{HW}$.

TABLE 1

|    | A1 | A2     | A3     |
|----|----|--------|--------|
| A1 | X  | (1, 0) | (0, 1) |
| A2 |    | X      | (0, 0) |
| A3 |    |        | X      |

In this example, there are three applications to be tested A1, A2, A3, and each of them has two hardware requirement items. Element (1, 0) of [A1, A2] represents that the first hardware requirement item of A1 and A2 is compatible but the second hardware requirement item of A1 and A2 is incompatible. Element (0, 1) of [A1, A3] represents that the first hardware requirement item of A1 and A3 is incompatible but the second hardware requirement item of A1 and A3 is compatible. Element (0, 0) of [A2, A3] represents that the first hardware requirement item of A2 and A3 is incompatible and the second hardware requirement item of A2 and A3 is also incompatible.

A software compatibility relationship matrix ($M^{SW}$) records compatibility relationships of each software requirement item between each pair of applications to be tested. As $M^{SW}$ is similar to $M^{HW}$, it is not detailed here.

Returning to step S120, JProfiler® may be used to determine resources and execution times needed by the test cases for the at least two applications to be tested in one embodiment.

In one embodiment, resources needed by test cases for applications to be tested may comprise one or more of CPU, Memory, and Storage. Of course, those skilled in the art would appreciate that resources needed by test cases for applications to be tested are not limited to the above three and may comprise other resources, such as bandwidth, etc.

Figure 2:
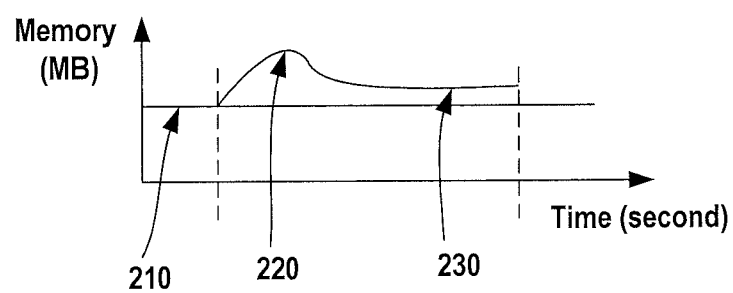
FIG. 2 schematically illustrates determined memory consumption situations of a test case.

FIG. 2 schematically illustrates determined memory consumption situations of a test case. In FIG. 2, the horizontal coordinate denotes time, and the vertical coordinate denotes consumed memory. In FIG. 2, numeral 210 denotes baseline memory consumption, i.e., the amount of consumed memory for running an application without running a test case, numeral 220 denotes peak memory consumption, and numeral 230 denotes stable memory consumption.

Those skilled in the art would appreciate that the determined CPU consumption situations and storage space consumption situations of a test case are similar to the memory consumption situations as described in FIG. 2.

In one embodiment of the present invention, test cases for at least two applications to be tested may be clustered to at least one VM instance based on peak resource consumption, stable resource consumption, or an average thereof.

In one embodiment of the present invention, test cases with matching needed resources and execution times among test cases for applications to be tested, whose compatibility relationship is compatible among at least two applications to be tested, are clustered to at least one VM instance.

Matching mentioned here means that the sum of resources needed by respective test cases matches resources provided by a VM instance. For example, the sum of resources needed by respective test cases is equal to or less than resources provided by a VM instance, and execution times of respective test cases are equal to or approximate to execution times of non-matching test cases, so that the utilization of a VM instance may be improved.

Table 2 shows determined CPU and memory resources and runtime consumed by test cases T1, T2 of to-be-tested application A1, test cases T1 and T2 of to-be-tested application A2, and by baseline of the applications to be tested A1 and A2 (i.e., running the applications to be tested A1 and A2 without running a test case).

TABLE 2

| Applications | Test Cases/Baseline | CPU (Hz) | Memory (Bit) | Runtime |
|---|---|---|---|---|
| A1 | Baseline | 0.5 G | 0.5 G |  |
|  | T1 | 0.1 G | 0.4 G | 2 Days |
|  | T2 | 1 G | 0.5 G | 5 Days |
| A2 | Baseline | 0.3 G | 0.6 G |  |
|  | T1 | 0.3 G | 1 G | 4 Days |
|  | T2 | 0.1 G | 0.15 G | 2 Days |

As shown in Table 2, the baseline of the to-be-tested application A1 consumes 0.5 G of CPU and 500M of Memory; the test case T1 of the to-be-tested application A1 consumes 0.1 G of CPU and 400M of Memory and needs to run for 2 days; the test case T2 of the to-be-tested application A1 consumes 1 G of CPU and 500M of Memory and needs to run for 5 days. The baseline of the to-be-tested application A2 consumes 0.3 G of CPU and 600M of Memory; the test case T1 of the to-be-tested application A2 consumes 0.3 G of CPU and 1 G of Memory and needs to run for 4 days; the test case T2 of the to-be-tested application A2 consumes 0.1 G of CPU and 150M of Memory and needs to run for 2 days.

Tables 3A-3C show resources provided by corresponding VM instances.

TABLE 3A

| Level | CPU (Hz) | Memory (Bit) | Storage (Bit) |
|---|---|---|---|
| Small | 1 G | 1.7 G | 160 G |
| Large | 4 G | 7.5 G | 850 G |
| XL | 8 G | 15 G | 1690 G |

TABLE 3B

| Level | CPU (Hz) | Memory (Bit) | Storage (Bit) |
|---|---|---|---|
| XL | 6.5 G | 17.1 G | 420 G |
| Dbl XL | 13 G | 34.2 G | 850 G |
| Qud XL | 26 G | 68.4 G | 1690 G |

TABLE 3C

| Level | CPU (Hz) | Memory (Bit) | Storage (Bit) |
|---|---|---|---|
| Medium | 5 G | 1.7 G | 350 G |
| XL | 20 G | 7 | 1690 G |

Table 3A is aimed at a standard VM instance, Table 3B is aimed at a high-memory VM instance, and Table 3C is aimed at a high-CPU instance.

As shown in Table 3A, resources provided by a standard small VM instance are 1 G CPU, 1.7 G Memory, and 160 G Storage; resources provided by a standard large VM instance are 4 G CPU, 7.5 G Memory, and 850 G Storage; resources provided by a standard extra large VM instance are 8 G CPU, 15 G Memory, and 1690 G Storage.

As shown in Table 3B, resources provided by a high-memory extra large VM instance are 6.5 G CPU, 17.1 G Memory, and 420 G Storage; resources provided by a high-memory double extra large VM instance are 13 G CPU, 34.2 G Memory, and 850 G Storage; resources provided by a high-memory quadruple extra large VM instance are 26 G CPU, 68.4 G Memory, and 1690 G Storage.

As shown in Table 3C, resources provided by a high-CPU medium VM instance are 5 G CPU, 1.7 G Memory, and 350 G Storage; resources provided by a high-CPU extra large VM instance are 20 G CPU, 7 G Memory, and 1690 G Storage.

Furthermore, suppose that it is evaluated that both a hardware compatibility relationship and a software compatibility relationship between the applications to be tested A1 and A2 are compatible.

Figure 3:
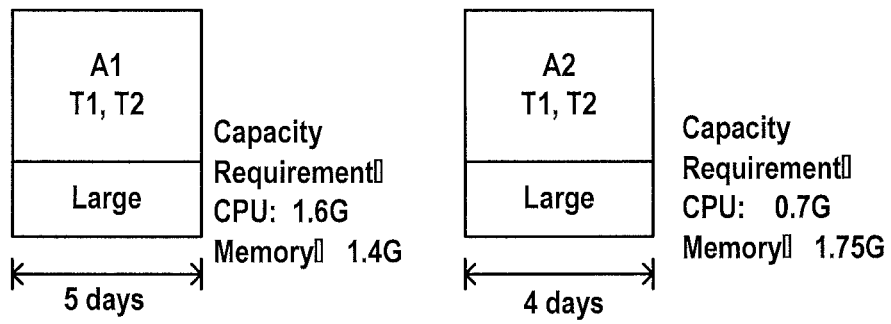
FIG. 3 illustrates circumstances in which test cases for applications to be tested A1 and A2 are allocated to VM instances according to the prior art.

FIG. 3 illustrates a circumstance in which test cases for the applications to be tested A1 and A2 are allocated to VM instances according to the prior art.

In the prior art, test cases for A1 are allocated to one VM instance for 5 days, and test cases for A2 are allocated to another VM instance for 4 days.

For the to-be-tested application A1, according to Table 2, a total CPU resource demand is 0.5 G+0.1 G+1 G=1.6 G, and a total memory resource demand is 0.5 G+0.4 G+0.5 G=1.4 G; for the to-be-tested application A2, a total CPU resource demand is 0.3 G+0.3 G+0.1 G=0.7 G, and a total memory resource demand is 0.6 G+1 G+0.15 G=1.75 G. Hence, test cases for the applications to be tested A1 and A2 are allocated to a standard large VM instance respectively according to resources provided by VM instances as shown in Tables 3A-3C.

Figure 4:
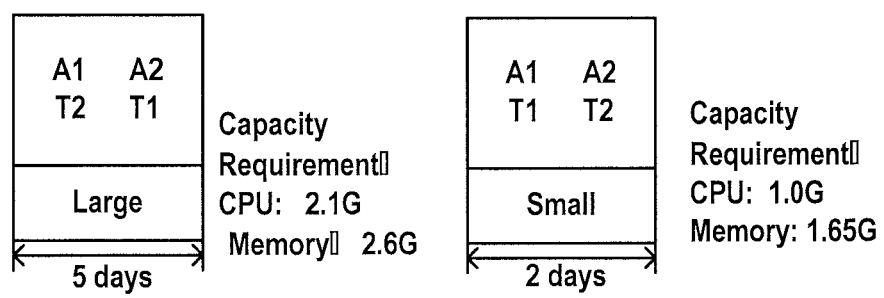
FIG. 4 illustrates circumstances in which test cases for applications to be tested A1 and A2 are allocated to VM instances according to embodiments of the present invention.

FIG. 4 illustrates a circumstance in which test cases for the applications to be tested A1 and A2 are allocated to VM instances according to embodiments of the present invention.

In one embodiment, according to resources provided by VM instances as shown in Tables 3A-3C, and to resource consumption and runtime of the test cases T1, T2 of the to-be-tested application A1, the test cases T1 and T2 of the to-be-tested application A2, and the baseline of the applications to be tested A1 and A2 as shown in Table 2, as well as based on the assumption that both a hardware compatibility relationship and a software compatibility relationship between the applications to be tested A1 and A2 are compatible, the test case T2 of the to-be-tested application A1 and the test case T1 of the to-be-tested application A2 are allocated to the standard large VM instance shown in Table 3A for 5 days, and the test case T1 of the to-be-tested application A1 and the test case T2 of the to-be-tested application A2 are allocated to the standard small VM instance shown in Table 3A for 2 days.

Compared with the prior art of respectively allocating test cases for the applications to be tested A1 and A2 to standard large VM instances for 5 days and 4 days, allocating the test case T2 of the to-be-tested application A1 and the test case T1 of the to-be-tested application A2 to a standard large VM instance for 5 days and allocating the test case T1 of the to-be-tested application A1 and the test case T2 of the to-be-tested application A2 to a standard small VM instance for 2 days according to embodiments of the present invention can significantly increase the utilization of VM, that is, from occupying two standard large VM instances for 5 days and 4 days to occupying one standard large VM instance for 5 days and one standard small VM instance for 2 days.

Figure 5:
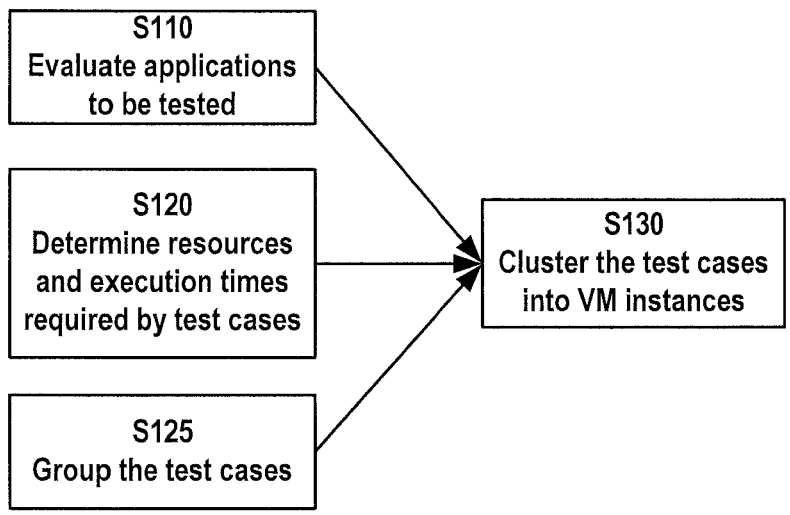
FIG. 5 illustrates a flowchart of a method for processing test cases for applications to be tested according to another embodiment of the present invention.

FIG. 5 illustrates a flowchart of a method for processing test cases for applications to be tested according to another embodiment of the present invention. Compared with the method 100 for processing test cases for applications to be tested according to one embodiment of the present invention as illustrated in FIG. 1, the method 500 further comprises step S125. At step S125, test cases are grouped based on a certain rule (e.g., based on function); that is, test cases that perform the same function are grouped together. In addition, test cases for the applications to be tested are clustered to at least one VM instance at the test case group granularity at step S130.

For example, regarding an online store, test cases may be grouped into a user management test case group, a stock management test case group, a purchase test case group, a pay test case group, a customer service test case group, a shipping test case group, etc. Test cases in a test case group are sequentially executed on a VM instance. To this end, resource consumption and execution times of all test cases in a test case group need to be added up to obtain resource consumption and an execution time of such test case group.

Figure 6:
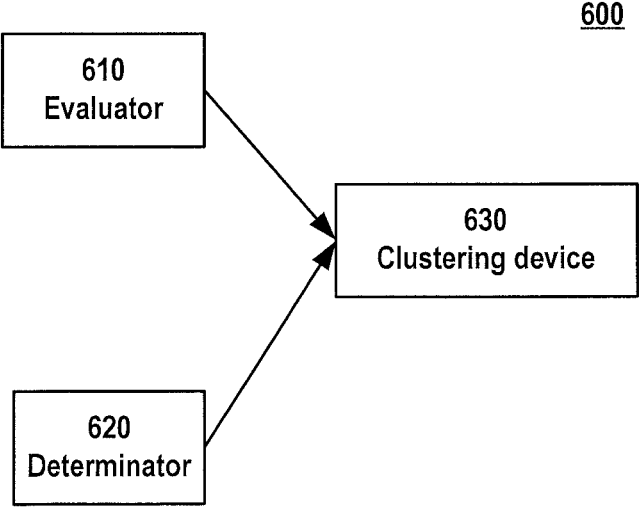
FIG. 6 illustrates a block diagram of a system for processing test cases for applications to be tested according to an embodiment of the present invention.

FIG. 6 illustrates a block diagram of a system for processing test cases for applications to be tested according to one embodiment of the present invention.

As illustrated in FIG. 6, the system 600 comprises: an evaluator 610 configured to evaluate at least two applications to be tested to determine a compatibility relationship between the at least two applications to be tested; a determinator 620 configured to obtain test cases for the at least two applications to be tested and determine resources and execution times needed by the test cases for the at least two applications to be tested; and a clustering device 630 configured to cluster, according to the compatibility relationship between the at least two applications to be tested and the resources and execution times needed by the test cases for the at least two applications to be tested, the test cases for the at least two applications to be tested to at least one VM instance so as to test the test cases for the at least two applications to be tested on the at least one VM instance.

The compatibility relationship between the at least two applications to be tested comprises one of a hardware compatibility relationship and a software compatibility relationship.

The hardware compatibility relationship refers to whether hardware needed by one application to be tested is compatible with hardware needed by another to-be-tested application.

According to one embodiment of the present invention, the evaluator 610 determines a hardware compatibility relationship between two applications to be tested based on whether types of hardware needed by the two applications to be tested are identical.

When the types of hardware needed by the two applications to be tested are identical, it is determined that the hardware compatibility relationship between the two applications to be tested is compatible.

When the types of hardware needed by the two applications to be tested are different, it is determined that the hardware compatibility relationship between the two applications to be tested is incompatible.

According to one embodiment of the present invention, the evaluator 610 may further determine a hardware compatibility relationship between two applications to be tested based on whether the existence of different types of hardware will affect the execution of the two applications to be tested or not.

In the event that types of hardware needed by one application to be tested differ from types of hardware needed by the other one, if the existence of different types of hardware will not affect the execution of the two applications to be tested, it is determined that a hardware compatibility relationship between the two applications to be tested is compatible. If the existence of different types of hardware will affect the execution of the two applications to be tested, it is determined that a hardware compatibility relationship between the two applications to be tested is incompatible.

In one embodiment of the present invention, the evaluator 610 may further determine a hardware compatibility relationship between two applications to be tested based on whether specific hardware needed by the two applications to be tested is identical.

In the event that types of hardware needed by one application to be tested are the same as types of hardware needed by the other one, if specific hardware needed by one application to be tested is the same as specific hardware needed by the other one, it is determined that the hardware compatibility relationship between these two applications to be tested is compatible. If specific hardware needed by one application to be tested is different from specific hardware needed by the other one, it is determined that the hardware compatibility relationship between these two applications to be tested is incompatible.

The software compatibility relationship refers to whether software needed by one application to be tested is compatible with software needed by another to-be-tested application.

According to one embodiment of the present invention, the evaluator 610 determines a software compatibility relationship between two applications to be tested based on whether types of software needed by the two applications to be tested are identical.

When the types of software needed by the two applications to be tested are different, it is determined that the software compatibility relationship between the two applications to be tested is incompatible.

When the types of software needed by the two applications to be tested are identical, it is determined that the software compatibility relationship between the two applications to be tested is compatible.

In one embodiment of the present invention, the evaluator 610 further determines a software compatibility relationship between two applications to be tested based on whether specific software needed by the two applications to be tested is identical.

In the event that types of software needed by one application to be tested are the same as types of software needed by the other one, if specific software needed by one application to be tested is the same as specific software needed by the other one, it is determined that the software compatibility relationship between these two applications to be tested is compatible. If specific software needed by one application to be tested is different from specific software needed by the other one, it is determined that the software compatibility relationship between these two applications to be tested is incompatible.

In one embodiment of the present invention, the evaluator 610 further determines a software compatibility relationship between two applications to be tested based on whether versions of specific software needed by the two applications to be tested are compatible.

In the even that specific software needed by one application to be tested is identical to specific software needed by the other one, if a version of specific software needed by one application to be tested is compatible with a version of specific software needed by the other one, i.e., a higher version of specific software includes functions of a lower version of the specific software, then it is determined that the software compatibility relationship between these two applications to be tested is compatible. If a version of specific software needed by one application to be tested is incompatible with a version of specific software needed by the other one, i.e., a higher version of specific software does not include some functions of a lower version of the specific software, then it is determined that the software compatibility relationship between these two applications to be tested is incompatible.

According to one embodiment of the present invention, the evaluator 610 further determines a software compatibility relationship between two applications to be tested based on whether configurations of the two applications to be tested conflict.

If configurations of two applications to be tested conflict, it is determined that the software compatibility relationship between the two applications to be tested is incompatible.

If configurations of two applications to be tested do not conflict, it is determined that the software compatibility relationship between the two applications to be tested is compatible.

In one embodiment of the present invention, the evaluator 610 further determines a software compatibility relationship between two applications to be tested based on whether a configuration of at least one of the two applications to be tested can be modified.

In the event that configurations of two applications to be tested conflict, if the configuration of at least one of the two applications to be tested can be modified, then it is determined that the software compatibility relationship between the two applications to be tested is compatible; if the configuration of neither of the two applications to be tested can be modified, it is determined that the software compatibility relationship between the two applications to be tested is incompatible.

In one embodiment of the present invention, the evaluator 610 further determines a software compatibility relationship between two applications to be tested based on whether the existence of different types of software will affect the execution of the two applications to be tested or not.

In the event that types of software needed by one application to be tested differs from types of software needed by the other one, if the existence of different types of software will not affect the execution of the two applications to be tested, it is determined that the software compatibility relationship between the two applications to be tested is compatible. If the existence of different types of software will affect the execution of the two applications to be tested, it is determined that the software compatibility relationship between the two applications to be tested is incompatible.

In one embodiment of the present invention, the evaluator 610 further determines a software compatibility relationship between two applications to be tested based on whether the existence of different specific software will affect the execution of the two applications to be tested or not.

In the event that specific software needed by one application to be tested differs from specific software needed by the other one, if the existence of different specific software will not affect the execution of the two applications to be tested, it is determined that the software compatibility relationship between the two applications to be tested is compatible. If the existence of different specific software will affect the execution of the two applications to be tested, it is determined that the software compatibility relationship between the two applications to be tested is incompatible.

Resources needed by each test case of each application to be tested comprise at least one or more of CPU, Memory, and Storage.

Of course, those skilled in the art would appreciate that resources needed by each test case of each application to be tested are not limited to the above three and may comprise other resources, such as bandwidth, etc.

In one embodiment of the present invention, the clustering device 630 clusters to at least one VM instance test cases with matching needed resources and execution times among test cases for applications to be tested, whose compatibility relationship is compatible among at least two applications to be tested.

Matching mentioned here means that the sum of resources needed by respective test cases matches resources provided by a VM instance. For example, the sum of resources needed by respective test cases is equal to or less than resources provided by a VM instance, and execution times of respective test cases are equal to or approximate to execution times of non-matching test cases, so that the utilization of a VM instance may be improved.

Figure 7:
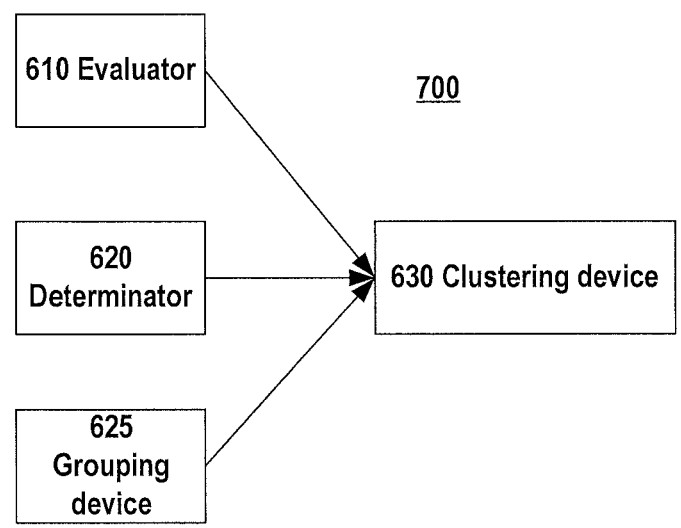
FIG. 7 illustrates a block diagram of a system for processing test cases for applications to be tested according to another embodiment of the present invention.

FIG. 7 illustrates a block diagram of a system for processing test cases for applications to be tested according to another embodiment of the present invention. Compared with the system 600 for processing test cases for applications to be tested according to one embodiment of the present invention as illustrated in FIG. 6, the system 700 further comprises a grouping device 625. The grouping device 625 groups test cases based on a certain rule (e.g., based on function), i.e., grouping together test cases that perform the same function. In addition, the clustering device 630 clusters test cases for the applications to be tested to one or more VM instances at the test case group granularity.

Embodiments of the present invention may be implemented in a Cloud environment. However, it is to be understood that although this disclosure includes a detailed description on cloud computing, implementation of the technical solutions recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: cloud computing capabilities are available over a network and accessed through standard mechanisms that promote use of cloud by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: computing resources can be rapidly and elastically provisioned, in some cases automatically, to quickly scale out and rapidly released to quickly scale in. To the consumer, the computing resources available for provisioning often appear to be unlimited and can be obtained in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting traffic sharing technology for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
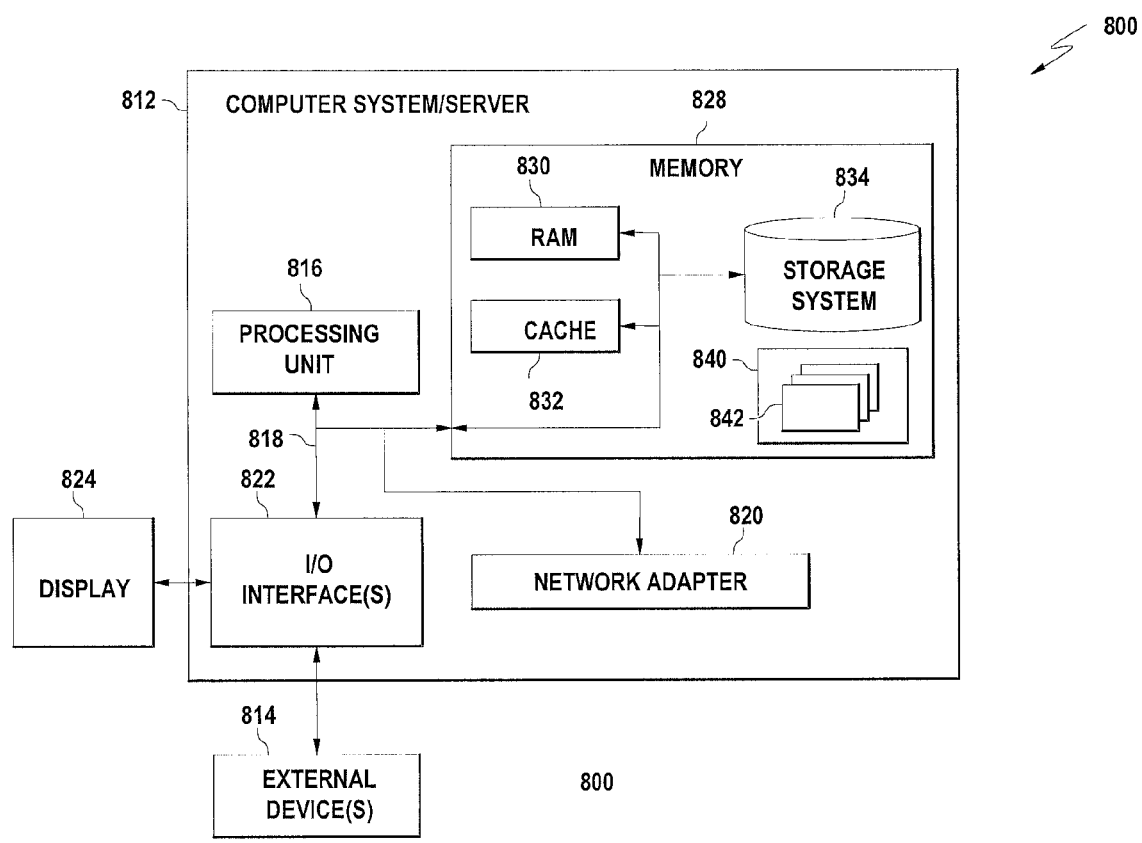
FIG. 8 illustrates a Cloud computing node according to an embodiment of the present invention.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800, there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 800 is shown in the form of a general-purpose computing device. The components of computer system/server 812 may include, but are not limited to, one or more processors or processing units 816, a system memory 828, and a bus 818 that couples various system components including system memory 828 and processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828, such program modules 842 are by way of example, but not limited to, an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a wide area network (WAN), and/or a public network (e.g., the Internet) via network adapter 820. As depicted, network adapter 820 communicates with the other components of computer system/server 812 via bus 818. It should be understood that although not shown, other hardware and/or software modules could be used in conjunction with computer system/server 812. Examples, include, but are not limited to: microcode, device drivers, redundant processing units, external disk drive arrays, RAID systems, tape drives, and data archival storage systems, etc.

Figure 9:
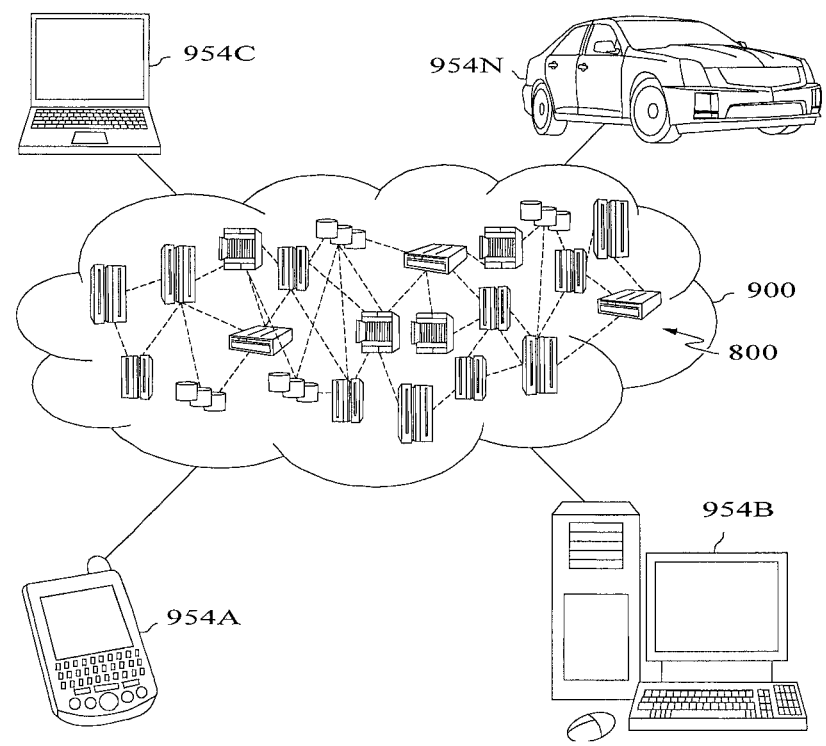
FIG. 9 illustrates a Cloud computing environment according to an embodiment of the present invention.

Referring now to FIG. 9, illustrative cloud computing environment 900 is depicted. As shown, cloud computing environment 900 comprises one or more cloud computing nodes 800 with which local computing devices used by cloud consumers, such as, for example, personal digital assistant (PDA) or cellular telephone 954A, desktop computer 954B, laptop computer 954C, and/or automobile computer system 954N may communicate. Nodes 800 may communicate with one another. Nodes 800 may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer can request without the need to maintain resources on a local computing device. It is understood that the types of computing devices 954A-N shown in FIG. 9 are intended to be illustrative only and that computing nodes 800 and cloud computing environment 900 can communicate with any type of computerized device over any type of network and/or network addressable connection (e.g., using a web browser).

Figure 10:
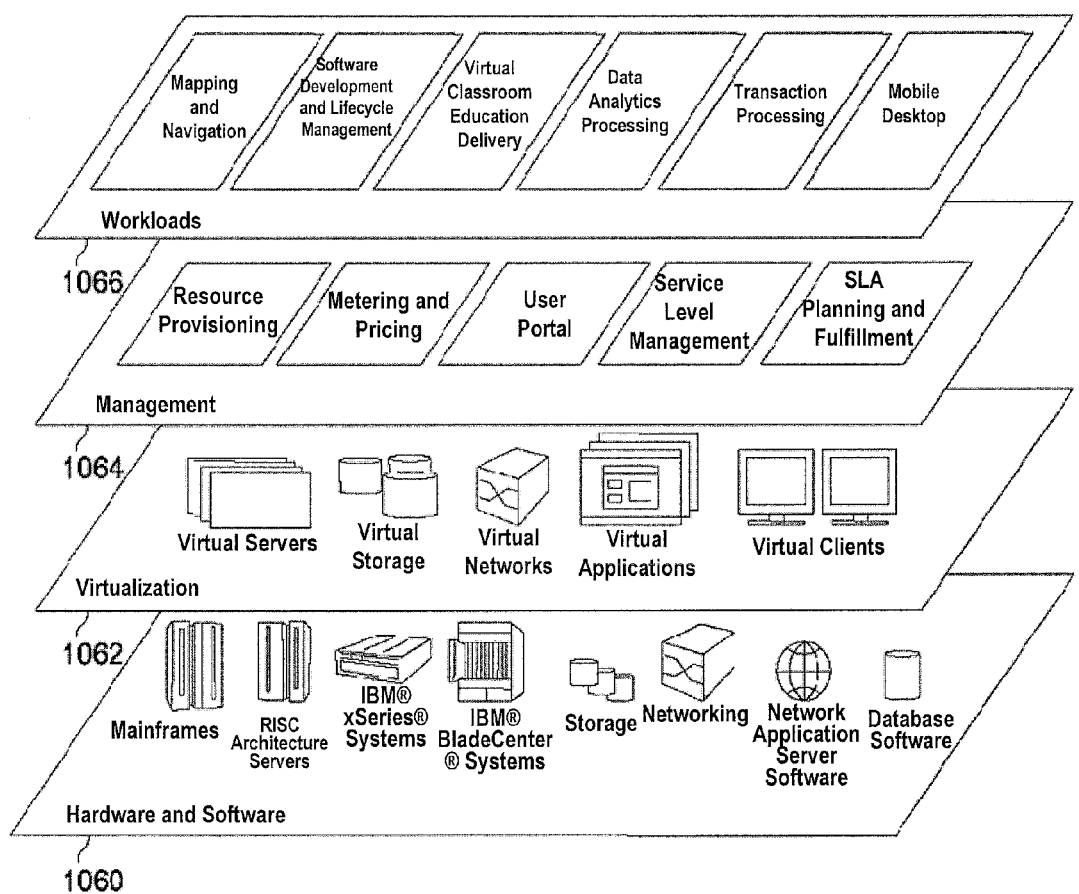
FIG. 10 illustrates abstraction model layers according to an embodiment of the present invention.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries®systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below: Resource provisioning provides dynamic procurement of computing resources and other resources that are utilized to perform tasks within the cloud computing environment (including the application testing of the present invention); Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that needed service levels are met. Service Level Agreement (SLA) planning and fulfillment provides pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop, etc.

It should be noted that to facilitate easier understanding of the present invention, the foregoing description omits some more detailed technical details that are well known to those skilled in the art and might be indispensable to the implementation of the present invention.

Those skilled in the art would further appreciate that the present invention is not limited to the steps described above but also includes a combination of the above-described steps, rearrangements of the sequence, etc. The ultimate scope of the present invention is defined by the appended claims.

The specification of the present invention has been presented for purposes of illustration and description, and is not intended to be exhaustive or to limit the invention to the form as disclosed. Many modifications and variations will be apparent to those of ordinary skill in the art. Those skilled in the art would further appreciate that the method and means in embodiments of the present invention may be implemented as software, hardware, firmware, or a combination thereof. In a preferred embodiment, the present invention is implemented as software, including but not limited to, firmware, resident software, micro-code, etc. The present invention may be implemented as a computer program product, which contains program code stored on a computer-readable medium and performing, when executed by a computer, the method described in embodiments of the present invention. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (or, apparatus or device), or propagation medium. Examples of the computer-readable medium would include the following: a semiconductor or solid state storage device, a magnetic tape, a portable computer diskette, a random access memory (RAM), a read-only memory (ROM), a hard disk, and an optical disk. Examples of current optical disk include a compact disk read-only memory (CD-ROM), compact disk-read/write (CR-R/W), and DVD.

Therefore, the embodiments were chosen and described in order to best explain the principles of the invention and the practical application thereof, and to enable others of ordinary skill in the art to understand that all modifications and alterations made without departing from the spirit of the present invention fall into the protection scope of the present invention as defined in the appended claims.

What is claimed is:

1. A method of processing test cases for applications to be tested, the method comprising:
    evaluating at least two applications to be tested to determine a compatibility relationship between the at least two applications to be tested;
    obtaining test cases for the at least two applications to be tested and determining resources and execution times needed by the test cases for the at least two applications to be tested; and
    according to the compatibility relationship between the at least two applications to be tested, and the resources and execution times needed by the test cases for the at least two applications to be tested, clustering the test cases for the at least two applications to be tested to at least one virtual machine instance to process the test cases for the at least two applications to be tested on the at least one virtual machine instance.

2. The method according to claim 1, wherein the compatibility relationship between the at least two applications to be tested comprises at least one of a hardware compatibility relationship and a software compatibility relationship.

3. The method according to claim 2, wherein the hardware compatibility relationship between the two applications to be tested is determined based on whether types of hardware needed by the two applications to be tested are identical.

4. The method according to claim 2, wherein the software compatibility relationship between the two applications to be tested is determined based on whether types of software needed by the two applications to be tested are identical.

5. The method according to claim 4, wherein the software compatibility relationship between the two applications to be tested is determined further based on whether specific software needed by the two applications to be tested is identical.

6. The method according to claim 5, wherein the software compatibility relationship between the two applications to be tested is determined further based on whether versions of specific software needed by the two applications to be tested are compatible.

7. The method according to claim 6, wherein the software compatibility relationship between the two applications to be tested is determined further based on whether configurations of the two applications to be tested conflict.

8. The method according to claim 7, wherein the software compatibility relationship between the two applications to be tested is determined further based on whether a configuration of at least one of the two applications to be tested is modifiable.

9. The method according to claim 1, further comprising grouping the test cases for the at least two applications to be tested based on a certain rule, and wherein the clustering the test cases for the at least two applications to be tested to at least one virtual machine instance comprises clustering the test cases for the at least two applications to be tested to at least one virtual machine instance at a granularity of the test case group.

10. The method according to claim 1, wherein test cases with matching needed resources and execution times among test cases for applications to be tested, whose compatibility relationship is compatible among the at least two applications to be tested, are clustered to the at least one virtual machine instance.

11. A system for processing test cases for applications to be tested, the system comprising:
an evaluator configured to evaluate, using a processor, at least two applications to be tested to determine a compatibility relationship between the at least two applications to be tested;
a determinator configured to obtain test cases for the at least two applications to be tested and determine resources and execution times needed by the test cases for the at least two applications to be tested; and
a clustering device configured to, according to the compatibility relationship between the at least two applications to be tested, and the resources and execution times needed by the test cases for the at least two applications to be tested, cluster the test cases for the at least two applications to be tested to at least one virtual machine instance to test process the test cases for the at least two applications to be tested on the at least one virtual machine instance.

12. The system according to claim 11, wherein the compatibility relationship between the at least two applications to be tested comprises at least one of a hardware compatibility relationship and a software compatibility relationship.

13. The system according to claim 12, wherein the evaluator determines the hardware compatibility relationship between the two applications to be tested based on whether types of hardware needed by the two applications to be tested are identical.

14. The system according to claim 12, wherein the evaluator determines the software compatibility relationship between the two applications to be tested based on whether types of software needed by the two applications to be tested are identical.

15. The system according to claim 14, wherein the evaluator further determines the software compatibility relationship between the two applications to be tested based on whether specific software needed by the two applications to be tested is identical.

16. The system according to claim 15, wherein the evaluator further determines the software compatibility relationship between the two applications to be tested based on whether versions of specific software needed by the two applications to be tested are compatible.

17. The system according to claim 16, wherein the evaluator further determines the software compatibility relationship between the two applications to be tested based on whether configurations of the two applications to be tested conflict.

18. The system according to claim 17, wherein the evaluator further determines the software compatibility relationship between the two applications to be tested based on whether a configuration of at least one of the two applications to be tested can be modified.

19. The system according to claim 11, further comprising:
a grouping device configured to group the test cases for the at least two applications to be tested based on a certain rule, and wherein the clustering device clusters the test cases for the at least two applications to be tested to at least one virtual machine instance at a granularity of the test case group.

20. The system according to claim 11, wherein the clustering device clusters to the at least one virtual machine instance test cases with matching needed resources and execution times among test cases for applications to be tested, whose compatibility relationship is compatible among the at least two applications to be tested.

21. A non-transitory computer readable storage medium comprising a computer readable program for processing test cases for applications to be tested, wherein the computer readable program when executed on a computer causes the computer to perform the steps of:
evaluating at least two applications to be tested to determine a compatibility relationship between the at least two applications to be tested;
obtaining test cases for the at least two applications to be tested and determining resources and execution times needed by the test cases for the at least two applications to be tested; and
according to the compatibility relationship between the at least two applications to be tested, and the resources and execution times needed by the test cases for the at least two applications to be tested, clustering the test cases for the at least two applications to be tested to at least one virtual machine instance to process the test cases for the at least two applications to be tested on the at least one virtual machine instance.

* * * * *